May 20, 1958     G. R. CONGER     2,835,318
TIRE INFLATION GUARD
Filed Aug. 12, 1954
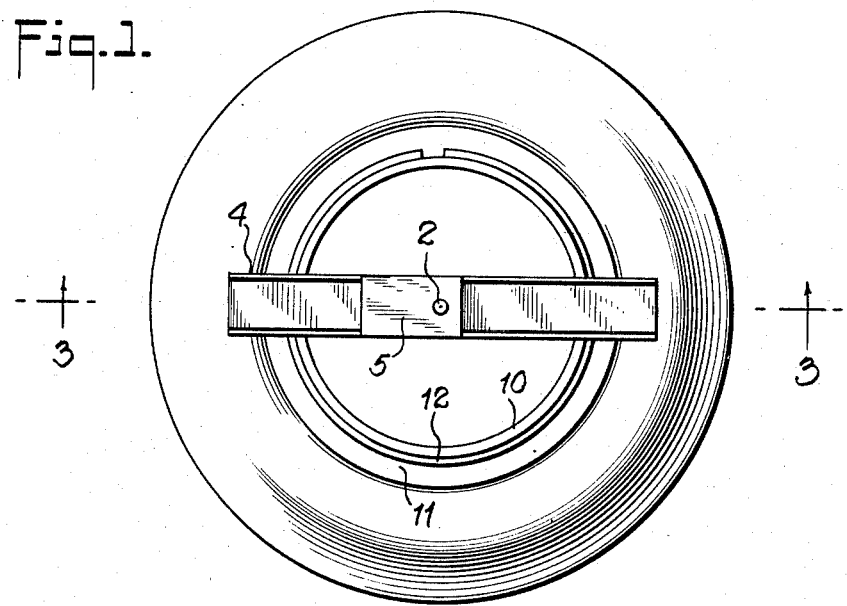
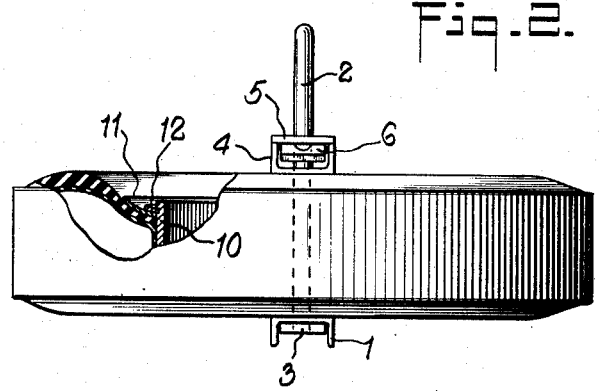
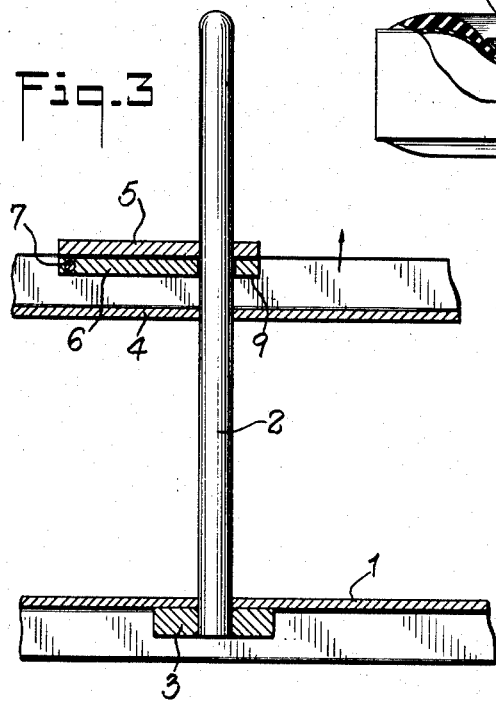
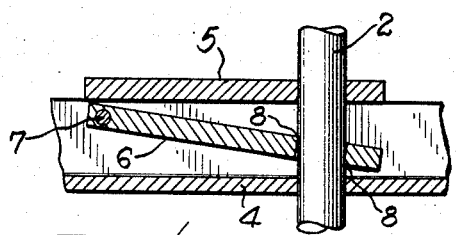
INVENTOR.
GEORGE RAYMOND CONGER
BY Ralph W. Bumstead
HIS ATTORNEY

United States Patent Office 2,835,318
Patented May 20, 1958

2,835,318

TIRE INFLATION GUARD

George Raymond Conger, Nixon, N. J.

Application August 12, 1954, Serial No. 449,401

2 Claims. (Cl. 157—1)

This invention relates to a tire inflation guard. It is a protective device for use when mounting and inflating tires. It safeguards a workman against injury in case of insecure assembly of the components of a tire rim. The flange and retaining ring, if improperly assembled with the main body part of the rim, creates a hazard during the inflation of the tire, since they are liable to fly off unexpectedly when the bead of the tire snaps into place upon inflation. Accidents caused in this manner have, at times been fatal.

It is, therefore, a prime object of my invention to provide a tire inflation guard for use in mounting and inflating a pneumatic tire. Another object is to provide a protective tire rim holder the construction of which affords ease of assembling with a tire and rim, and ease of removal after the inflation guard has served to safeguard the workman during the inflation of a tire.

Still another object is to provide the means for easily dis-assembling the inflation guard itself so that it can be stored in a compact space.

Other objects and advantages of my invention will be brought out in the detailed description to follow. This description is accompanied by a drawing the figures of which are biefly described as follows:

Figure 1 is a plan view of my improved guard assembled with a rim and tire for protective purposes while inflating the tire;

Fig. 2 shows an elevation view, partly broken away so that one can see in section a detail of rim and flange construction which, though not part of my invention, is essential to an understanding of the hazard against which my inflation guard provides insurance;

Figure 3 shows another elevation view which is also a cross section taken along the line 3—3 of Fig. 1. Here the inflation guard alone is shown, and Fig. 4 is an enlarged fragmentary section along the line 3—3 of Fig. 1. The two Figures 3 and 4 will be referred to when explaining the operation of a certain clamp member which in Fig. 3 appears in a release position and in Fig. 4 in a locking position.

The drawing shows a preferred embodiment of my invention. It will, however, be understood by those skilled in the art, that alternative designs and proportioning of the parts of the tire inflation guard may be adopted without departing from the spirit of the invention. In reducing my invention to practice I have made every effort to adapt it for use in mounting and inflating large and heavy tires such as are required for trucks, busses and airplanes. Ruggedness of construction is of prime importance. This consideration is what dictates the preferred use of channel bars for the cross-arms, although it will be understood that the cross-arms may be differently constructed if desired.

Fig. 3 shows in vertical cross section how the parts of my tire inflation guard are assembled, but omitting to include the tire and rim. Channel bar 1 serves as a base member and is referred to in the claims as the lower cross-bar. It has a hole through its center for inserting a post 2. The hole is sufficiently large to allow the post to slip freely through it. On the lower end of the post is a flange 3 which is securely and permanently fastened thereto in any suitable manner, as, for example, by welding. The part 3 may alternatively be integral with the post and formed as an enlargement thereof as by swaging.

An upper channel bar 4 has a hole through its center of such size as to allow the post 2 to slip freely through it. A top plate 5 has a hole in it of substantially the same diameter as that of the holes in the bars 1 and 4. This top plate bridges and is fastened to the side walls of the channel bar 4, it being preferable to make the fastening as by welding.

Underneath the top plate 5 is a hinged clutch member or clamp 6 which swings through a small arc on a pivot pin 7. This pin is held in place by insertion through holes in the side walls of the channel bar 4. The clutch member 6 has a hole through its thickness dimension of suitable diameter to admit the post and to form a slip fit with respect thereto. The slip fit is maintained, however, only when the clutch member 6 is held in the position shown in Fig. 3. For this purpose an operator may reach under the top plate 5, then grasp the free end 9 of the clutch member 6 and lift it against the under side of the top plate 5.

When the free end of the clutch member 6 is allowed to drop down, as by gravity, its hole axis becomes canted with respect to the axis of the post. It, therefore, exercises a locking action thereon. It grips the post more and more strongly with increased effort to raise the channel bar 4. Fig. 4 shows the clutch member 6 in the canted position. The biting edges of the hole in member 4 are shown at points 8 where it firmly grips the post walls.

Figs. 1 and 2 show how a tire and rim may be placed around the post 2, resting on the lower cross-bar 1. The post stands erect within the opening inside of the rim 10. The tire is assumed to be mounted on the rim 10 in readiness for inflation. The rim flange 11 is in place and is assumed to be secured by a split retaining ring 12. But in practice the workman may have failed to seat the retaining ring 12 in the groove provided therefor. In this case there is grave danger that, during inflation of the tire, the flange 11 and ring 12 will fly off suddenly.

Now the utility of my invention should be apparent. When the tire, rim, flange and retaining ring are all sandwiched between the lower and upper cross bars, these bars being secured together by the post and by the clutching action of the canted member 6, the flange 11 and ring 12 are restrained from flying further than to hit the upper cross bar 4. During the process of tire inflation, therefore, the workman is protected against a hazard which in the past has proven very great and costly.

After tire inflation to the desired pressure, assuming that the retaining ring 12 was properly seated in its rim groove, the upper cross-bar 4 can readily be removed by lifting the clutch member 6 with a finger or fingers of one hand while using the other hand to grasp and lift the cross-bar off from the post 2. If desired, the post can also be slipped out from the hole in the lower cross-bar 1, so as to deposit all parts of the tire inflation guard compactly in a suitable storage space.

The details of construction of the tire rim, its flange and the retaining ring as shown in Figs. 1 and 2 are conventional, but other constructions are sometimes employed. Whether one or another method of securing the flange to the rim were to be employed is of no concern to the carrying out of my invention. This is true because the rim, flange and retaining ring are not parts of the construction which I claim to be my invention. It is, however, of vital importance that my improved tire inflation guard be understood as a dependable safety device for use in the performance of a hazardous job.

Those skilled in the art will recognize that my invention is capable of modification in various ways without departing from the spirit of the invention. The details herein shown and described should, therefore, be understood to be merely illustrative. The claims are intended to be of such scope as will cover obvious modifications.

I claim:

1. In a device for protecting a workman against injury during inflation of a tire which has been assembled with a rim and a locking ring, two orificed guard members one of which is adapted to underlie and the other of which is adapted to overlie said tire-rim-ring assembly while the latter lies horizontal, a headed post the head of which is so proportioned as to be restrained from passing through either of the orifices in said guard members, while the shank portion of said post is freely admissible through said orifices, and an orificed clutch plate one end of which is pivotally mounted on said overlying guard member, the pivotal axis being substantially at right angles to the axis of the orifice in said guard member and at a distance therefrom which permits of canting the clutch plate axis with respect to the axis of the guard member orifice, the two said orifices being suitably aligned for passing the shank portion of said post through both orifices, said clutch plate being operable, when canted, to clutch said post and to restrain the same against slippage through the clutch plate's orifice, and a stop element affixed to said overlying guard member and so positioned that it restrains the free end of said clutch plate from being lifted appreciably above a de-clutching, that is, non-canting, position.

2. A tire inflation guard comprising a bottom cross-bar and a channeled top cross-bar, a post for intercoupling them on the two sides of a tire-equipped rim, said cross-bars being orificed at mid-points thereof, the orifices being dimensioned to fit loosely about the body of the post, the post having one end enlarged to prevent that end from slipping through said orifices, a bridging plate fastened laterally across the top cross-bar, this plate being orificed in substantial alignment with the orifice in that same cross-bar, thereby to enable insertion of the post therethrough, and a clutch member pivotally mounted within the channel of the top cross-bar, the pivotal axis being on one side of and at right angles to the post axis, the clutch member having an orifice loosely receiving the post and being adapted to swing between a position in which upward movement is arrested by the under-side of the bridging plate and a lower position in which its orifice walls when surrounding the post are canted with respect thereto and caused to clutch the same.

References Cited in the file of this patent

UNITED STATES PATENTS

| | | |
|---|---|---|
| 589,046 | Terry | Aug. 31, 1897 |
| 979,737 | Bernhard | Dec. 27, 1910 |
| 2,137,748 | Best | Nov. 22, 1938 |
| 2,348,618 | Gordon | May 9, 1944 |
| 2,476,209 | Monheit | July 12, 1949 |
| 2,644,497 | Wilmer et al. | July 7, 1953 |